United States Patent
Taniguchi et al.

(10) Patent No.: US 7,742,761 B2
(45) Date of Patent: Jun. 22, 2010

(54) MOBILE COMMUNICATION SYSTEM DETECTABLE MOBILE STATION MOVING OUT OF COMMUNICATION RANGE

(75) Inventors: Tsuyoshi Taniguchi, Fujisawa (JP); Masato Inagaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1016 days.

(21) Appl. No.: 11/482,727

(22) Filed: Jul. 10, 2006

(65) Prior Publication Data

US 2007/0060126 A1 Mar. 15, 2007

(30) Foreign Application Priority Data

Aug. 2, 2005 (JP) ............... 2005-224007

(51) Int. Cl.
*H04M 11/00* (2006.01)
*H04W 36/00* (2009.01)

(52) U.S. Cl. ............... 455/421; 455/436; 455/437; 455/438; 455/439; 455/440

(58) Field of Classification Search ......... 455/436–444, 455/421

See application file for complete search history.

(56) References Cited

U.S. PATENT DOCUMENTS

| | | | | |
|---|---|---|---|---|
| 5,924,034 A | * | 7/1999 | Dupuy | ............... 455/440 |
| 6,556,822 B1 | * | 4/2003 | Matsumoto | ............... 455/421 |
| 6,567,670 B1 | * | 5/2003 | Petersson | ............... 455/522 |
| 7,092,709 B1 | * | 8/2006 | Honkala et al. | ............... 455/432.1 |
| 2004/0178906 A1 | * | 9/2004 | Vaughan et al. | ............... 340/539.21 |
| 2006/0109825 A1 | * | 5/2006 | Abdel-Kader et al. | ....... 370/338 |

FOREIGN PATENT DOCUMENTS

| | | |
|---|---|---|
| JP | 6-86353 | 3/1994 |
| JP | 11-243586 | 9/1999 |
| JP | 2004-364223 | 12/2004 |

OTHER PUBLICATIONS

3GPP2 C.S20024 cdm2000 "High Rate Packet Data Air Interface Specification".

* cited by examiner

*Primary Examiner*—Vincent P Harper
*Assistant Examiner*—Marisol Figueroa
(74) *Attorney, Agent, or Firm*—Antonelli, Terry, Stout & Kraus, LLP.

(57) ABSTRACT

In a mobile communication system, a base station controller has a handoff information management table for storing distance information for each mobile station notified from each of base stations and a detection unit for updating the handoff information management table each time a new handoff information was received from the base stations and detecting any of the mobile stations that is moving out of a service area into an out-of-communication range. The detection unit performs the out-of-range detection by selecting any of the mobile stations currently communicative only with one or more of the border cell base stations as a detection target and comparing the distance information in the handoff information management table with a predetermined threshold value.

4 Claims, 13 Drawing Sheets

MOBILE COMMUNICATION SYSTEM DETECTABLE MOBILE STATION MOVING OUT OF COMMUNICATION RANGE

CLAIM OF PRIORITY

The present application claims priority from Japanese application serial No. 2005-224007, filed on Aug. 2, 2005, the content of which is hereby incorporated by reference into this application.

BACKGROUND OF THE INVENTION (1) Field of the Invention

The present invention relates to a mobile communication system and, more particularly, to a mobile communication system which allows high-accuracy detection of a mobile station (mobile terminal) currently moving out of a communication service area into an out-of-communication range.

(2) Description of the Related Art

As an out-of-range detection method used in a conventional mobile communication system, there has been known one which calculates the approximate position of a mobile station from the placement location of a base station currently communicating with the mobile station and from the power level of a radio wave received from the mobile station and thereby detects the movement of the mobile station out of communication range. Examples of such a method are proposed in Japanese Unexamined Patent Publication Nos. Hei 6-86353 and Hei 11-243586. According to the method disclosed in Japanese Unexamined Patent Publication No. 2004-364223, an application server has map information on the service area of a mobile communication system and detects the movement of a mobile station moving toward out of communication range by plotting positional information calculated by the mobile station equipped with a GPS (Global Positioning System) on the map of the service area.

On the other hand, a signal round-trip delay between a base station and a mobile station has been described in detail in 3GPP2 C.S0024 cdma2000 "High Rate Packet Data Air Interface Specification" (Non-Patent Document). In this document, the phase difference between the mobile station and the base station is defined as "On-Way Delay" with accuracy represented by the chips of the CDMA spread code as units. The document also shows that, for the mobile station having set a wireless channel with the base station, the "One-Way Delay" can be measured at any time. In addition, the document graphically illustrates that the round-trip delay between the base station and the mobile station is double the "One-Way Delay".

Each of the prior art technologies described above has attempted to detect the mobile station moving out of the service area by judging whether an adjacent cell exists in the direction of progress of the mobile station. However, these prior art technologies, in reality, can merely detect a mobile station having moved into a cell which has no adjacent cells in the direction of progress thereof and the accuracy with which the movement of the mobile station toward the outside of the service area is detected is not high. In order to recognize the direction of progress of the mobile station, it is a precondition that a handover history is left for each of the mobile stations. However, in the case of a mobile communication system which is large in cell size and low in the placement density of the base stations, e.g., the frequency of the occurrence of handover is low so that the accuracy of prediction as to the direction of progress of the mobile station based on the handover history deteriorates. As a result, the problem is encountered that a sudden change in the direction of progress of the mobile station cannot be recognized properly.

Moreover, because out-of-range detection based on the power level of the radio wave received from a mobile station is susceptible to the influence of variations in an environment in which the radio wave propagates, there is the possibility of erroneous warning given to the mobile station moving within the service area. In a mobile communication system of a code division multiple access (CDMA) type, in particular, the level of an output signal from each of the mobile stations is power-controlled under an instruction from the base station such that the reception signal at the base station is kept at a constant level. Therefore, it is impossible to calculate the position of the mobile station based on the reception signal level.

A system using the GPS and the service area map information can perform the out-of-range detection of the mobile station with high accuracy. However, an approach using the system presents the problem that the structure of the mobile communication system is complicated and not only the mobile stations but also each of the base stations become higher in cost. In addition, the region where a GPS radio wave can be received is different from the range where a mobile radio wave reaches. Therefore, even within the service area of mobile communication, there exists a region where the out-of-range detection of the mobile station is impossible for the system because the GPS radio wave does not reach there, such as, e.g., an underground mall where a wireless base station is placed.

SUMMARY OF THE INVENTION

An object of the present invention is to provide a mobile communication system which allows high-accuracy detection of a mobile station moving out of communication range without using the GPS.

In order to attain the object, in the mobile communication system according to the present invention, each of the base stations comprises a system parameter storage for storing a base station identifier and a border flag indicative of whether the base station is a border cell base station forming a border cell located on a boundary portion of a service area or a normal cell base station forming a normal cell located on the inward side than the border cell and a distance calculation unit for calculating a distance to each of the mobile stations connected via wireless channels and notifying the base station controller of distance information of each of the mobile stations in conjunction with the base station identifier and the border flag as handoff information.

The base station controller has a handoff information management table for storing the base station identifier, the border flag, and the mobile station distance information notified from each of the base stations in association with each of mobile station identifiers and an out-of-range detection unit for updating the handoff information management table each time a new handoff information is received from each of the base stations and detecting any of the mobile stations moving out of the service area into an out-of-communication range.

The out-of-range detection unit performs out-of-range detection of the mobile station by selectively monitoring any of the mobile stations that is currently communicative only with one or more of the border cell base stations discriminated by a state of the border flag as a target of out-of-range detection and comparing the distance information of each of the mobile stations indicated by the handoff information management table with a predetermined threshold value.

The threshold value used for the out-of-range detection may be either a value common to the plurality of base stations or an individual value specific to each of the base stations. When the threshold value common to the plurality of base stations is used, it is appropriate to, e.g., select the distance information with a minimum value from among the distance information on the same mobile station measured at the plurality of border cell base stations and compare the selected minimum distance information with the threshold value. When the individual threshold value specific to each of the base stations is used, it is appropriate to determine whether the distance to the mobile station has exceeded respective threshold values in all of the border cells communicative with the same mobile station.

With the mobile communication system according to the present invention, it becomes possible to detect, among the mobile stations currently communicative only with one or more of border cell base stations, any mobile station at a distance exceeding the threshold as the mobile station moving out of the service area and transmit an out-of-range warning message to the detected mobile station. In one aspect of the present invention, a warning flag indicative of whether the out-of-range warning message has been transmitted or not is stored in association with each of the mobile station identifiers in the handoff information management table and the out-of-range detection unit clears the warning flag when it detects that any of the mobile stations, for which the warning flag indicates that the out-of-range warning message has been transmitted, has become communicative with one of the border cell base stations or that the distance between the mobile station and the border cell base station has fallen within a range of a second threshold (within-range threshold) value smaller than the threshold for out-of-range detection.

The present invention selectively monitors any of the mobile stations that is currently communicative only with one or more of the border cell base stations based on the precondition that the mobile station in the border cell located on the boundary of the service has a higher possibility of moving out of the service area (communication range) and gives the out-of-range warning to the monitored mobile station when the distance thereto has exceeded the threshold. Therefore, the present invention is implementable using conventional communication protocols for a mobile communication system and does not need the GPS or map information.

DESCRIPTION OF PREFERRED EMBODIMENTS

Figure 1:
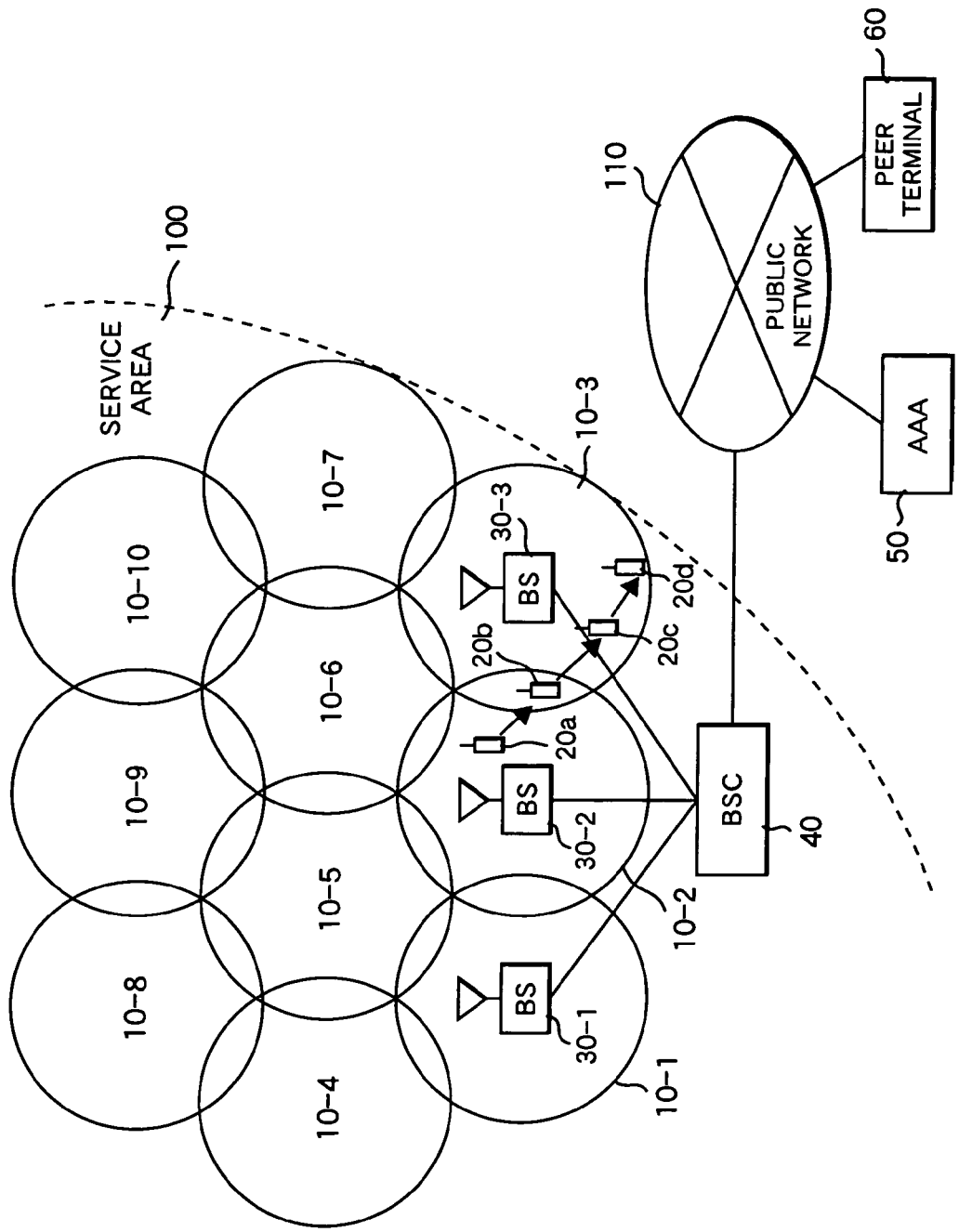
FIG. 1 is a view showing a network structure for a mobile communication system to which the present invention is applied.

Referring now to the drawings, embodiments of the present invention will be described in detail herein below.

FIG. 1 shows a network structure for a mobile communication system to which the present invention is applied.

The mobile communication system is constituted by a plurality of base stations 30 (30-1, 30-2, . . . ) each connected to a plurality of mobile stations via wireless channels and a base station controller (BSC) 40 connected to the base stations. The base station controller 40 is connected to an AAA (Authentication, Authorization and Accounting) server 50 for performing authentication and accounting of mobile stations via a public network 110. A plurality of cells 10 (10-1 to 10-10) are formed depending on a radio wave arrival range of each of the base stations 30. An assembly of these cells forms the service area 100 of the mobile communication system.

In FIGS. 1, 20a, 20b, 20c, and 20d show that a mobile station 20 is moving out of the cell 10-2 into the cell 10-3 toward the outside of the service area 100. In the present specification, the cells located on the border of the service area 100 will be termed "border cells". Out-of-range detection means the detection of any mobile station moving within one of the border cells toward the outside of the service area 100 such as, e.g., the mobile station 20d.

The mobile station 20 located within the service area 100 is connected to the base station controller 40 via the nearest base station 30. The base station controller 40 communicates with the AAA server 50 which manages specific information on each of the mobile stations and controls communication between any of the mobile station 20 having succeeded in authentication and a peer terminal, e.g., a terminal 60. As an example of an AAA protocol, the RADIUS (Remote Authentication Dial In User Service) protocol standardized by the IETF (Internet Engineering Task Force) has been known.

Figure 2:
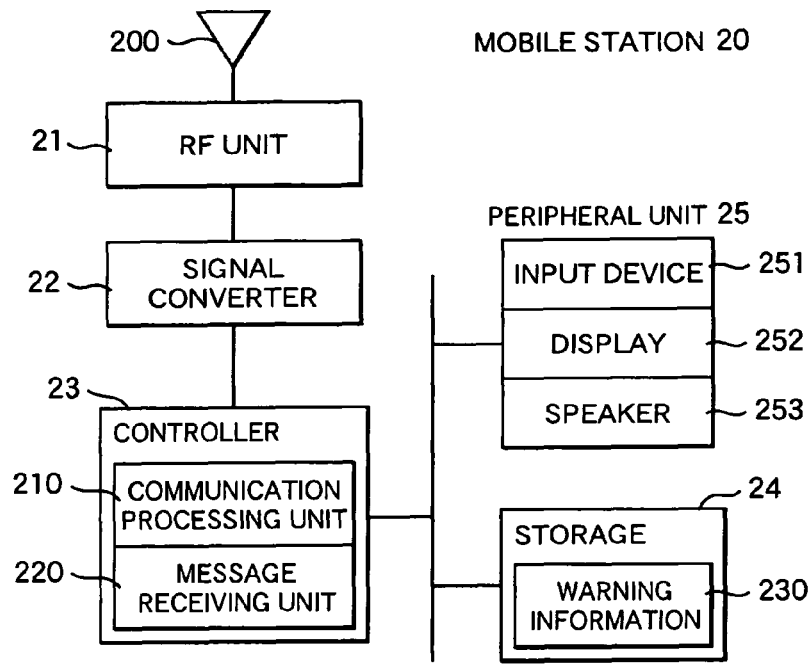
FIG. 2 is a block diagram showing an example of the structure of a mobile station 20.

FIG. 2 is a block diagram showing an example of the structure of the mobile station 20.

The mobile station 20 is comprised of an antenna 200, an RF unit 21 for transmitting and receiving wireless signals to or from the base station 30 via the antenna 200, a signal converter 22 for performing modulation/demodulation processing on the wireless signals, a controller 23 connected to the signal converter 22, a storage 24 connected to the controller 23, and a peripheral unit 25 connected to the controller 23. The peripheral unit 25 is comprised of an input device 251 including, e.g., various buttons for data input and a microphone for voice input, a display 252 comprised of an LCD or LED for displaying input data and information such as a received message, and a speaker 253 for voice output.

The controller 23 is comprised of a processor for executing various programs, provided with a communication processing unit 210 and a message receiving unit 220 as functional parts to which the present invention relates, and performs setting/releasing processing for a wireless channel with the base station 30. The communication processing unit (communication processing routine) 210 exchanges control signals for a wireless protocol process with the base station controller 40 via the signal converter 22 and the RF unit 21. Upon receiving a warning message from the base station controller 40, the message receiving unit (message receiving processing routine) 220 stores the received message in a warning information memory 230 prepared in the storage 24 and notifies the user that he or she is moving out of service range through the display 252 or the speaker 253, as will be described later.

Figure 3:
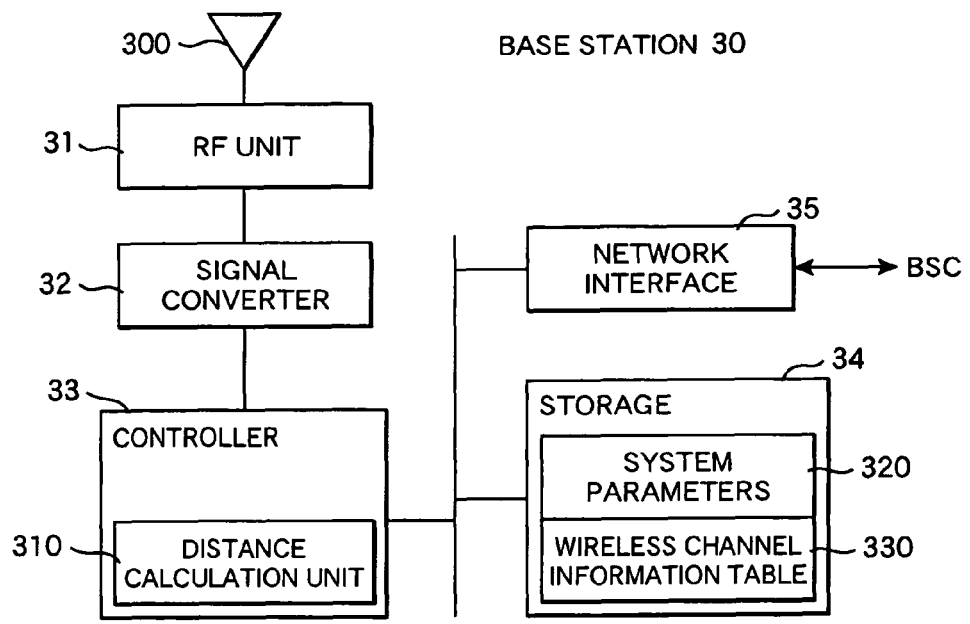
FIG. 3 is a block diagram showing an example of the structure of a base station 30.

FIG. 3 is a block diagram showing an example of the structure of the base station 30.

The base station 30 is comprised of an antenna 300, an RF unit 31 for transmitting and receiving wireless signals to or from the mobile station 20 via the antenna 300, a signal converter 32 for performing modulation/demodulation processing on the wireless signals, a controller 33 connected to the signal converter 32, a storage 34 connected to the controller 33, and a network interface 35 serving as a connection interface with the base station controller 40.

The controller 33 is comprised of a processor for executing various programs and has the function of setting/releasing a wireless channel for the mobile station 20 and the function of controlling the transfer of communication packets between the mobile station 20 and the base station controller 40. The controller 33 is provided with a distance calculation unit (distance calculation routine) 310 as a functional part related to the present invention. The distance calculation unit 310 calculates the distance between the mobile station 20 and the base station 30 based on a signal round-trip delay on a wireless channel set up therebetween, as will be described later. The distance calculation is repeated periodically or irregularly for the duration of the wireless channel, triggered by the setting up of the wireless channel.

In the storage 34, a system parameter memory 320 to which parameters specific to each of the base stations are set and a wireless channel information table 330 for managing a wireless channel for each of mobile stations located within the cells are formed.

Figure 4:
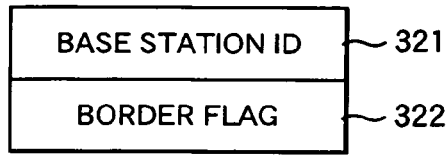
FIG. 4 is a view showing an embodiment of system parameters stored in a system parameter memory 320 by the base station 30.

In the system parameter memory 320, a base station ID 321 serving as identification information of the base station 30 and a border flag 322 indicative of whether the cell formed by the base station 30 is a border cell or a normal cell are stored, as shown in FIG. 4.

Figure 5:
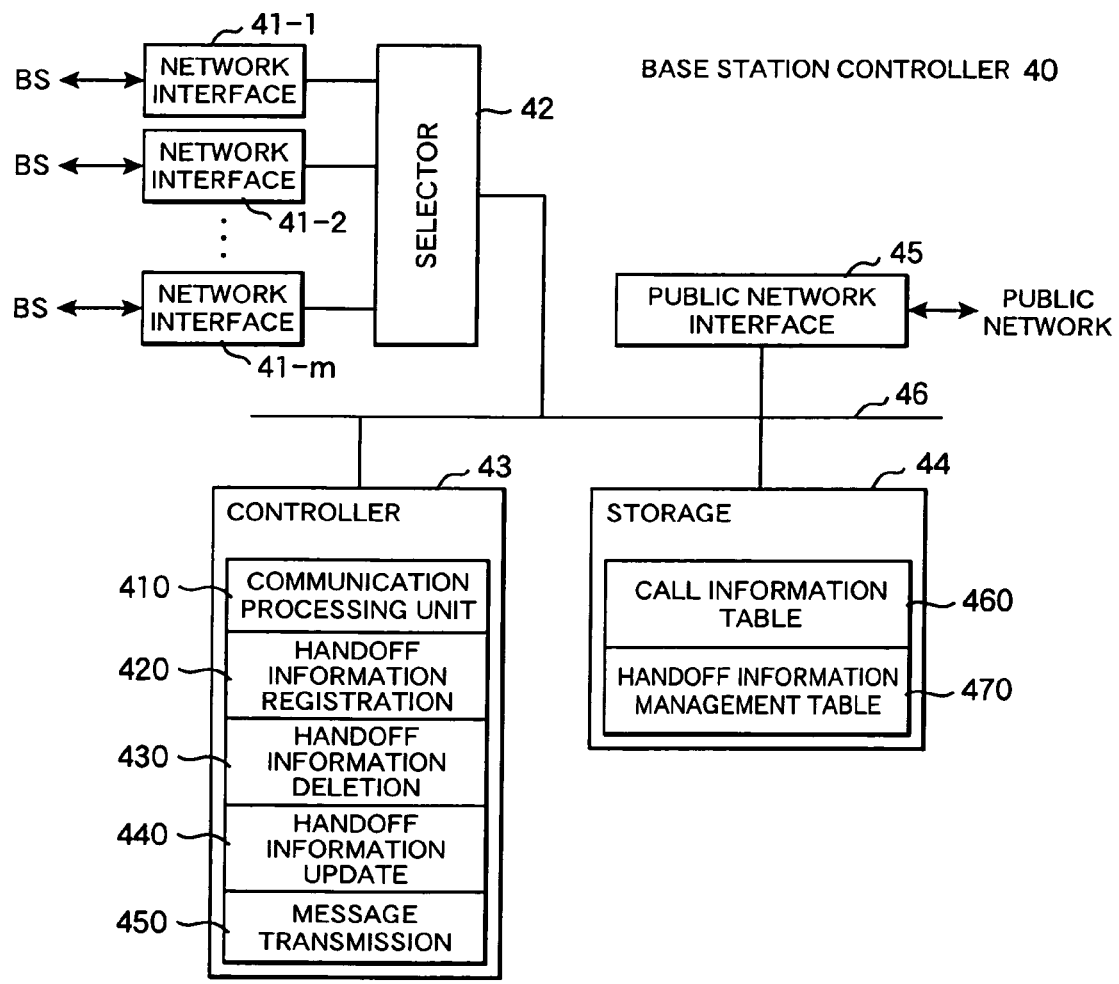
FIG. 5 is a block diagram showing an example of the structure of a base station controller 40.

FIG. 5 is a block diagram showing an example of the structure of the base station controller 40.

The base station controller 40 is comprised of a plurality of network interfaces 41 (41-1 to 41-m) serving as connection interfaces with the individual base stations 30, a selector 42 to which the network interfaces 41 are connected, a controller 43, a storage 44, a public network interface 45 serving as a connection interface with the public network 110, and internal buses 46.

The controller 43 is comprised of a processor for executing various programs and provided with a communication processing unit (communication processing routine) 410 for performing wireless protocol processing between the base station controller 40 and the mobile station 20, a handoff information registration processing unit (handoff information registration processing routine) 420, a handoff information deletion processing unit (handoff information deletion processing routine) 430, a handoff information update processing unit (handoff information update processing routine) 440 and a message transmission unit (message transmission processing routine) 450 for transmitting a warning message to any of the mobile stations 20 moving out of service range. The processing units 420, 430 and 440 individually perform adding, deleting, and modifying with respect to handoff information in accordance with changes in the connection relationship between the base station 30 and the mobile station 20.

In the storage 44, a call information table 460 for managing wireless protocol information for each of the mobile stations located within the service area 100 and a handoff information management table 470 for storing handoff information for each of the mobile stations located within the service area are formed.

Figure 6:
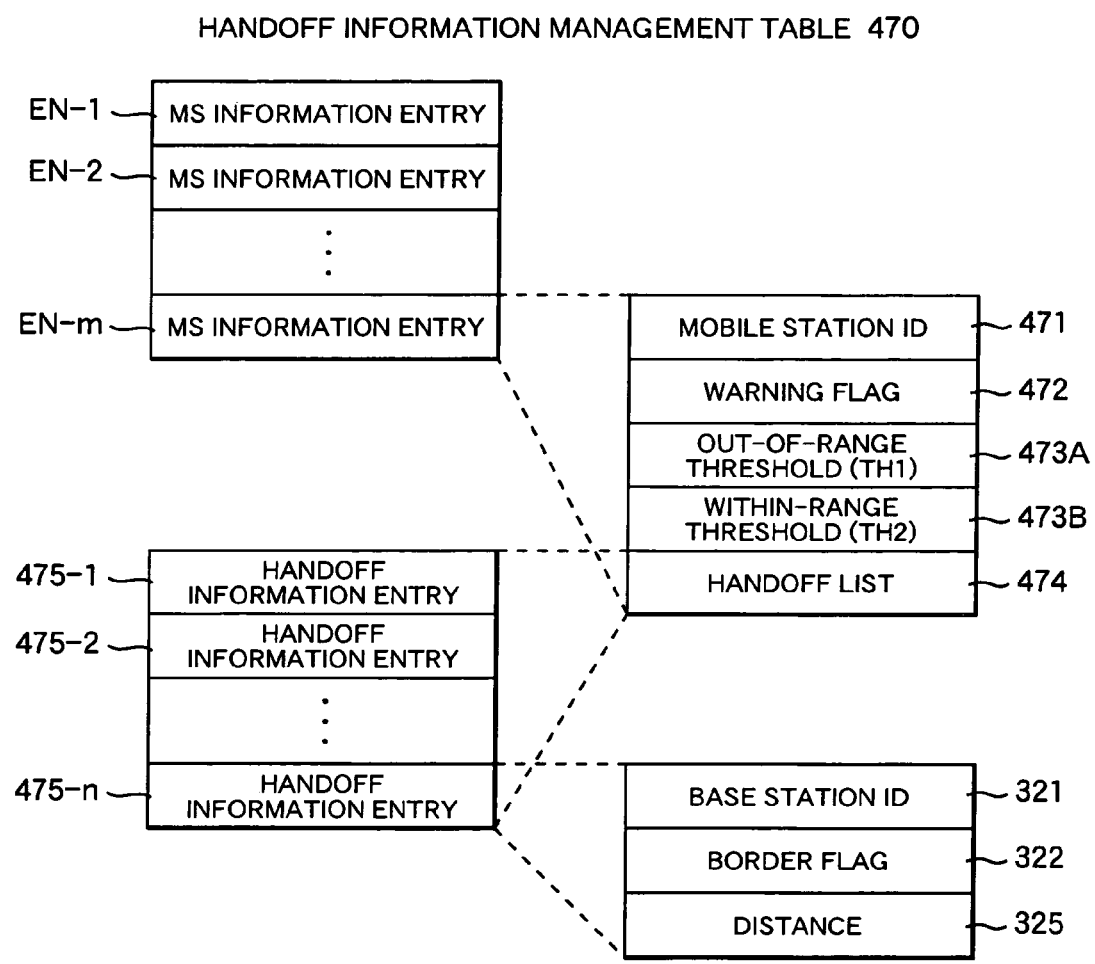
FIG. 6 is a view showing an embodiment of mobile station information stored in a handoff information management table 470 by the base station controller 40.

FIG. 6 shows information blocks stored in the handoff information management table 470.

The handoff information management table 470 stores a plurality of MS (mobile station) information entries EN-i each corresponding to a mobile station 20i (i=1 to m) located within the service area. Each of the MS information entries EN-i is comprised of the identifier (ID) 471 of the mobile station 20i, a warning flag 472 indicative of whether a warning message has been transmitted to the mobile station 20i, an out-of-range threshold 473A to be used for the out-of-range detection of the mobile station 20i, a within-range threshold 473B to be used to detect the returning of the mobile station 20i into a service area, and a handoff list 474.

The handoff list 474 includes handoff information entries 475-j (j=1 to n) for each of the base stations communicating with the mobile stations 20i via the wireless channels. In the present embodiment, each of the handoff information entries 475-j indicates a base station ID 321, a border flag 322 indicative of whether the cell formed by the base station is a border cell or not, and a distance 325 to the mobile station 20i calculated by the base station. In the handoff information management tables 470, a new handoff information entry 475 is registered when a session was set up between the base station and the mobile station 20i. The handoff information entry 475 is deleted from the handoff information management table 470 when the session was released.

Figure 7:
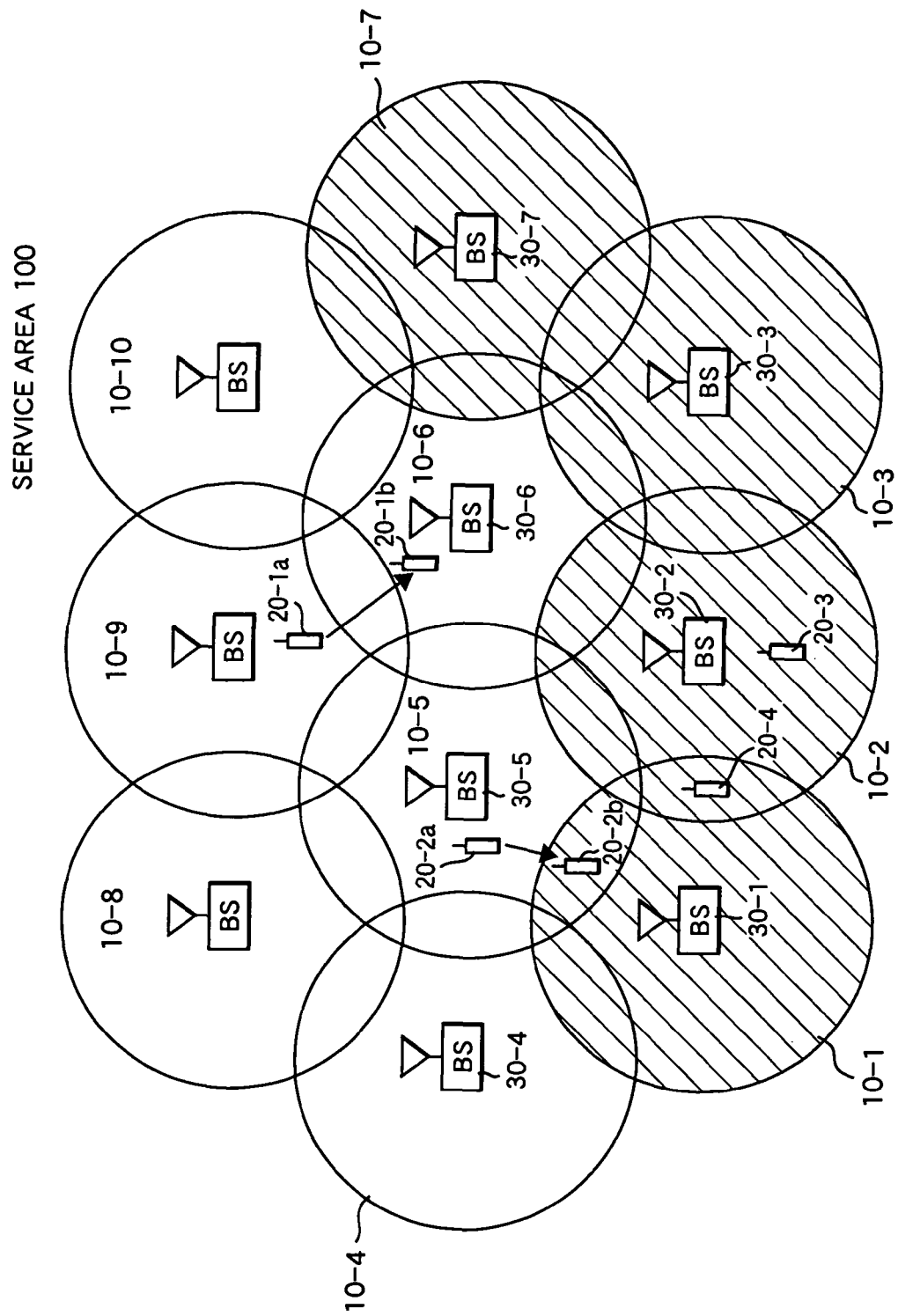
FIG. 7 is a view for illustrating the relationship between a cell structure and the positions of the mobile stations in the service area of the mobile communication system.

FIG. 7 shows the relationship between normal cells and border cells which form the service area 100. In the drawing, the hollow circles represent the normal cells located in the inner region of the service area 100 and the hatched circles represent the border cells located on the border of the service area.

Each of the mobile stations communicates with another terminal via any of the base stations 30 and the base station controller 40, while moving within the service area 100 comprised of the group of normal cells and the group of border cells. Since the normal cells are formed in overlapping relation with a plurality of surrounding cells, the possibility that the mobile station located within any of the normal cells immediately moves out of communication range is low. For example, not only when the mobile station has moved from one of the normal cells into another, as shown by 20-1a and 20-1b, but also when the mobile station has moved from one of the normal cells into one of the border cells, as shown by 20-2a and 20-2b, the possibility that the mobile station immediately moves out of communication range is low as long as the mobile station is located within the range where it is communicative with any of the normal cell base stations.

On the other hand, a mobile station located in any of the border cells communicative only with one or more of the border cell base stations has a high possibility of moving out of the service area (communication range). For example, the mobile station 20-3 communicative only with the base station 30-2 for the border cell 10-2 and the mobile station 20-4 which is located at the boundary portion between the border cells 10-1 and 10-2 and communicative only with the base stations 30-1 and 30-2 for the border cells have a high possibility of moving out of service range before long.

The present invention is characterized in that the base station controller 40 stores information on the handoff that has occurred in each of the mobile stations in the management table 470, as shown in FIG. 6, and performs out-of-range detection by selectively monitoring, as the targets of out-of-range detection, mobile stations that are currently communicative only with the border cell base stations.

Figure 8:
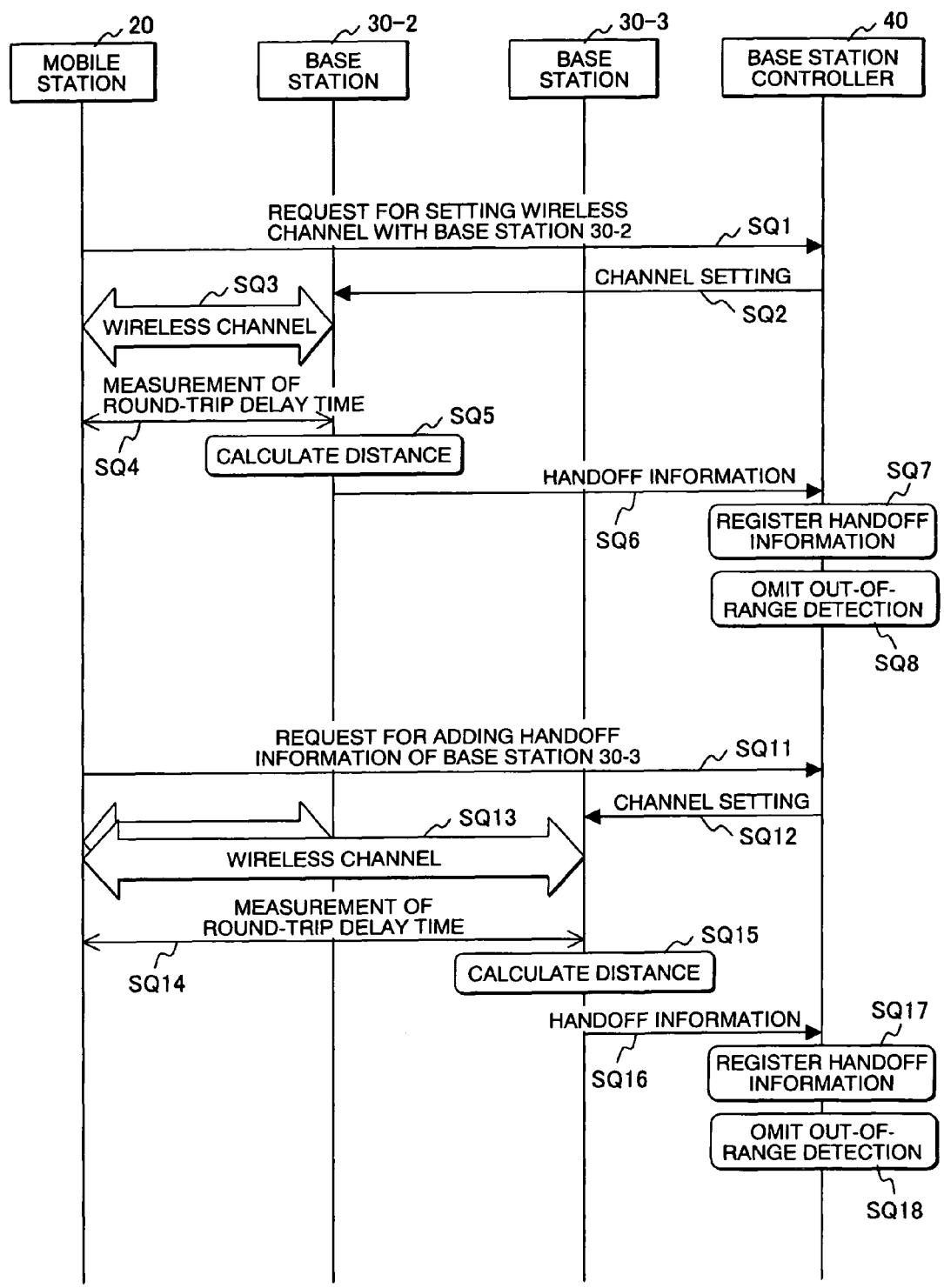
FIG. 8 is a view showing a first embodiment of a communication sequence in the mobile communication system according to the present invention.
Figure 9:
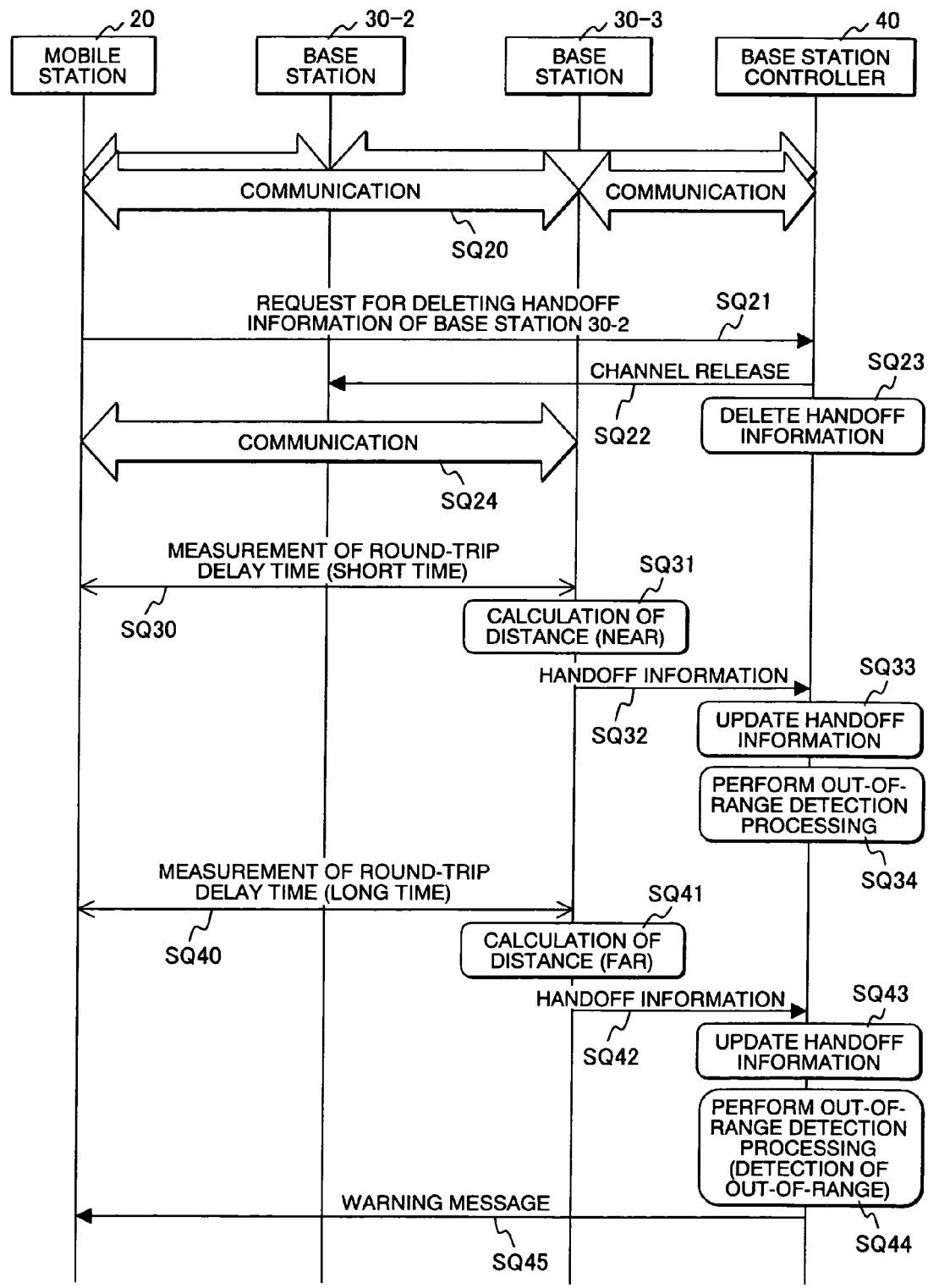
FIG. 9 is a view showing an example of the communication sequence to be performed in the case where the mobile station has moved out of a normal cell into a border cell.

With reference to FIGS. 8 and 9, a detailed description will be given next to the first embodiment of a communication sequence to be performed in the mobile communication system according to the present invention when the mobile station 20a which started mobile communication in the normal cell 10-2 of FIG. 1 has moved toward an out-of-communication range outside the border cell 10-3.

The mobile station 20 (20a) having moved into the cell 10-2 transmits to the base station controller 40 a control signal indicating a request for setting up a wireless channel with the base station 30-2 (SQ1). The base station controller 40 having received the control signal transmits an instruction signal for channel setting to the base station 30-2 (SQ2). The base station 30-2 having received the channel setting instruction signal sets up a wireless channel with the mobile station 20a (SQ3). At this time, the distance calculation unit 310 of the base station 30-2 measures the signal round-trip delay on the wireless channel for the mobile station 20a (SQ4) and calculates the distance between the mobile station 20a and the base station 30-2 from the value of the measured round-trip delay (SQ5).

The distance to the mobile station can be calculated in accordance with the round-trip delay shown in, e.g., Non-Patent Document 1 as follows.

One chip of the cdma 2000 spread code is 1.2288 MHz=0.8138 microseconds. Since the propagation speed of a radio wave is 3.0×108 (m/s), one chip is approximately 244 (m). Accordingly, when the round-trip delay measured by the base station for a given mobile station is A chips, the "One-Way Delay" thereof becomes A/2 chips and the distance to the mobile station can be calculated to be 244×A/2=122×A (m).

The base station 30-2 notifies the base station controller 40 of the distance to the mobile station 20a calculated by using the distance calculation unit 310 as handoff information (SQ6). Besides the information on the distance to the mobile station 20a, the handoff information also includes the mobile station identifier, the base station ID, and the border flag information indicative of whether the cell formed by the source base station is the border cell or not.

Upon receiving the handoff information, the base station controller 40 activates the handoff information registration processing unit 420 and registers a new handoff information entry in the handoff information management table 470 (SQ7). In FIG. 1, since the cell formed by the base station 30-2a is treated as the normal cell, the base station controller 40 does not perform out-of-range detection with respect to the mobile station 20 (20a) having set up the wireless channel with the base station 30-2 (SQ8).

When the mobile station 20 communicating in the cell 10-2 moves into the border cell 10-3 formed by the adjacent base station 30-3, it (mobile station 20b) transmits to the base station controller 40 a control signal indicating a request for adding the handoff information of the base station 30-3 (SQ11). Upon receiving the request for adding the handoff information, the base station controller 40 transmits a channel setting instruction signal to the base station 30-3 (SQ12).

Upon receiving the channel setting instruction signal, the base station 30-3 sets up a wireless channel with the mobile station 20 (20b) (SQ13). At this time, the distance calculation unit 310 of the base station 30-3 measures a signal round-trip delay on the wireless channel for the mobile station 20b (SQ14) and calculates the distance between the mobile station 20b and the base station 30-3 from the measured round-trip delay (SQ15).

The distance to the mobile station 20b calculated by the distance calculation unit 310 is notified to the base station controller 40 as handoff information (SQ16). Upon receiving the handoff information, the base station controller 40 activates the handoff information registration processing unit 420 and registers a new handoff information entry in the handoff information management table 470 (SQ17). In this case, it is known from the handoff list 474 of the mobile station 20 stored in the handoff information management table 470 that the mobile station 20 also has set up a wireless channel with the base station 30-2 in the normal cell so that the base station controller 40 does not perform out-of-range detection with respect to the mobile station 20 (SQ18).

A description will be given next to a communication sequence to be performed when the mobile station 20 (20b) has gone out of the communication range of the normal cell 10-2 and moved completely into the border cell formed by the base station 30-3, as shown by 20c in FIG. 1, with reference to FIG. 9.

In the boundary region between the normal cell 10-2 and the border cell 10-3, at the position indicated by 20b, the mobile station 20 is communicating with the base station controller 40 via the two wireless channels set up with the base stations 30-2 and 30-3 (SQ20). When the mobile station 20 goes out of the communication range of the normal cell 10-2 and moves completely into the border cell 10-3, it transmits a control signal indicating a request for deleting the handoff information of the base station 30-2 to the base station controller 40 (SQ21).

Upon receiving the request for deleting the handoff information, the base station controller 40 transmits to the base station 30-2 a control signal instructing to release the channel (SQ22). At this time, the base station controller 40 deletes the handoff information entry 475 for the base station 30-2 from the handoff list 474 of the mobile station 20 stored in the handoff information management table 470 by the handoff information deletion processing unit 430 (SQ23). Upon receiving the instruction for releasing the channel from the base station controller 40, the base station 30-2 releases the wireless channel for the mobile station 20. This brings the mobile station 20 into the state communicating only with the border cell base station 30-3 (SQ24).

While the mobile station 20 (20*c*) is communicating in the border cell 10-3 via the wireless channel with the base station 30-3, the distance calculation unit 310 of the base station 30-3 measures, periodically or with an arbitrary timing, the signal round-trip delay on the wireless channel for the mobile station 20*c* (SQ30) and calculates the distance to the mobile station 20*c* (SQ31). The distance to the mobile station 20 (20*c*) calculated by the distance calculation unit 310 is notified as handoff information to the base station controller 40 (SQ32).

Upon receiving the handoff information including the base station ID already registered in the handoff list 474 of the handoff information management table 470 from the base station (30-3), the base station controller 40 updates the distance 325 of the handoff information entry 475-*k* corresponding to the base station ID by using the handoff information update processing unit 440 (SQ33). At this time, the handoff information update processing unit 440 compares the new distance to the mobile station 20 shown by the received handoff information with an out-of-range threshold which has been set preliminarily. During the period the mobile station 20 is moving in a relatively close vicinity of the base station 30-3, the result of the comparison does not show the out-of-range detection of the mobile station 20 (SQ34). As long as the mobile station 20 is at a position relatively close to the base station 30-3, the same sequence as SQ30 to SQ34 described above is repeated.

It is assumed that the mobile station 20 has moved away from the base station 30-3 within the border cell 10-3 to the position 20*d* close to the boundary of the cell. The distance calculation unit 310 of the base station 30-3 measures the signal round-trip delay on the wireless channel for the mobile station 20*c* (SQ46), calculates the distance to the mobile station 20 SQ41), and notifies the base station controller 40 of the calculated distance as the handoff information in the same manner as in the sequence SQ30 to DQ32.

Upon receiving the handoff information from the base station 30-3, the base station controller 40 updates the distance 325 to the mobile station 20 in the handoff information entry for the base station 30-3 stored in the handoff information management table 470 by using the handoff information update processing unit 440 in the same manner as in SQ 33 (SQ43). As in the present example, when the mobile station 20 has moved to the boundary of the border cell, the result of the comparison between the new distance 325 and the out-of-range threshold indicates the out-of-range detection of the mobile station 20 (SQ44). In this case, the base station controller 40 transmits a warning message, the content of which is such as, e.g., "If you keep going this way, the communication may be cut off" by using the message transmission unit 450 (SQ45). The mobile station 20 having received the warning message stores the received message in the warning information memory 230 and notifies the user of the warning message.

Figure 10:
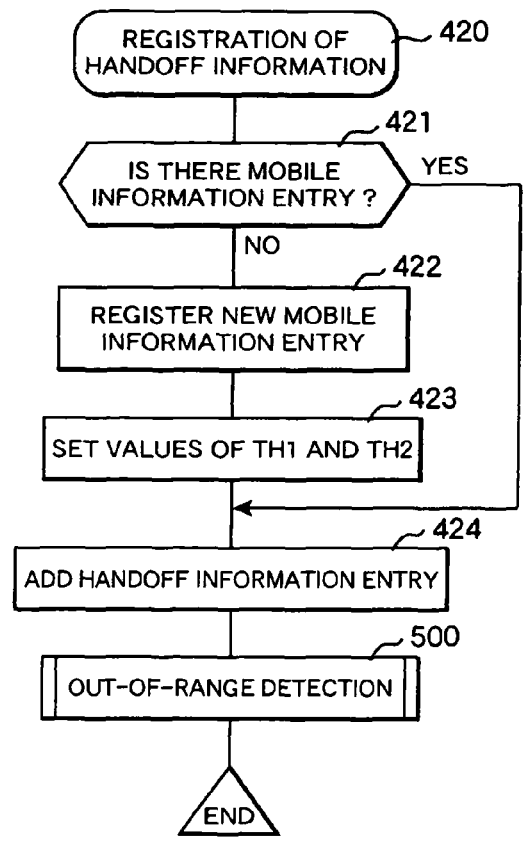
FIG. 10 is a flow chart showing the operation of the handoff information registration processing unit 420 in the base station controller 40.

FIG. 10 is a flow chart showing in detail the operation of the handoff information registration processing unit (handoff information registration processing routine executed by the processor) 420 of the base station controller 40.

The handoff information registration processing unit 420 is activated when the base station controller 40 receives the first handoff information from the base station for which the base station controller 40 has instructed the channel setting. The processor having activated the handoff information registration processing unit 420 refers to the handoff information management table 470 and determines the presence or absence of a MS information entry having the mobile station ID indicated by the received handoff information (421).

At the time (SQ1) when the mobile station first issued the request for setting the wireless channel, the MS information entry having the mobile station ID had not been registered yet in the handoff information management table 470. In this case, the processor generates a new MS information entry having the mobile station ID and registers the new MS information entry in the handoff information management table 470 (422). The warning flag 472 of the MS information entry is in a cleared state. After setting the out-of-range threshold 473A and the within-range threshold 473B to the MS information entry (423), the processor generates a new handoff information entry 475-1 based on the received handoff information, adds the new handoff information entry 475-1 to the handoff list 474 (424), and executes out-of-range detection processing 500, which will be described later in detail with reference to FIG. 12.

When the channel setting instruction to the base station is issued in response to the request for adding handoff information (SQ11) from the mobile station, the MS information entry having the mobile station ID has been already registered in the handoff information management table 470. In this case, the processor generates a new handoff information entry 475-*i* (i>1) based on the received handoff information, adds the new handoff information entry 475-*i* to the handoff list 474, and executes the out-of-range detection processing 500.

Figure 11:
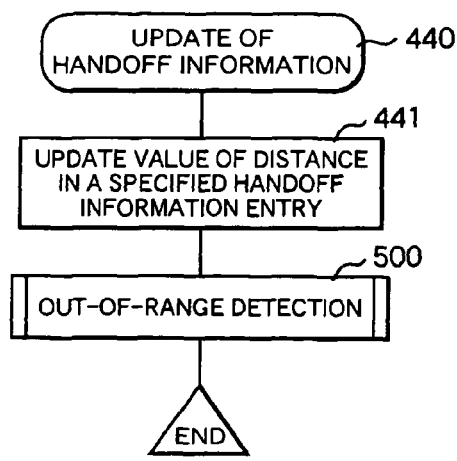
FIG. 11 is a flow chart showing the operation of the handoff information update processing unit 440 in the base station controller 40.

FIG. 11 is a flowchart showing the operation of the handoff information update processing unit (handoff information update processing routine executed by the processor) 440.

The handoff information update processing unit 440 is activated when the base station controller 40 receives the handoff information having the base station ID already registered in the handoff list 474. The processor having activated the handoff information update processing unit 440 updates the distance 325 in the handoff information entry corresponding to the mobile station ID and the base station ID of the received handoff information (441) and executes the out-of-range detection processing 500.

Figure 12:
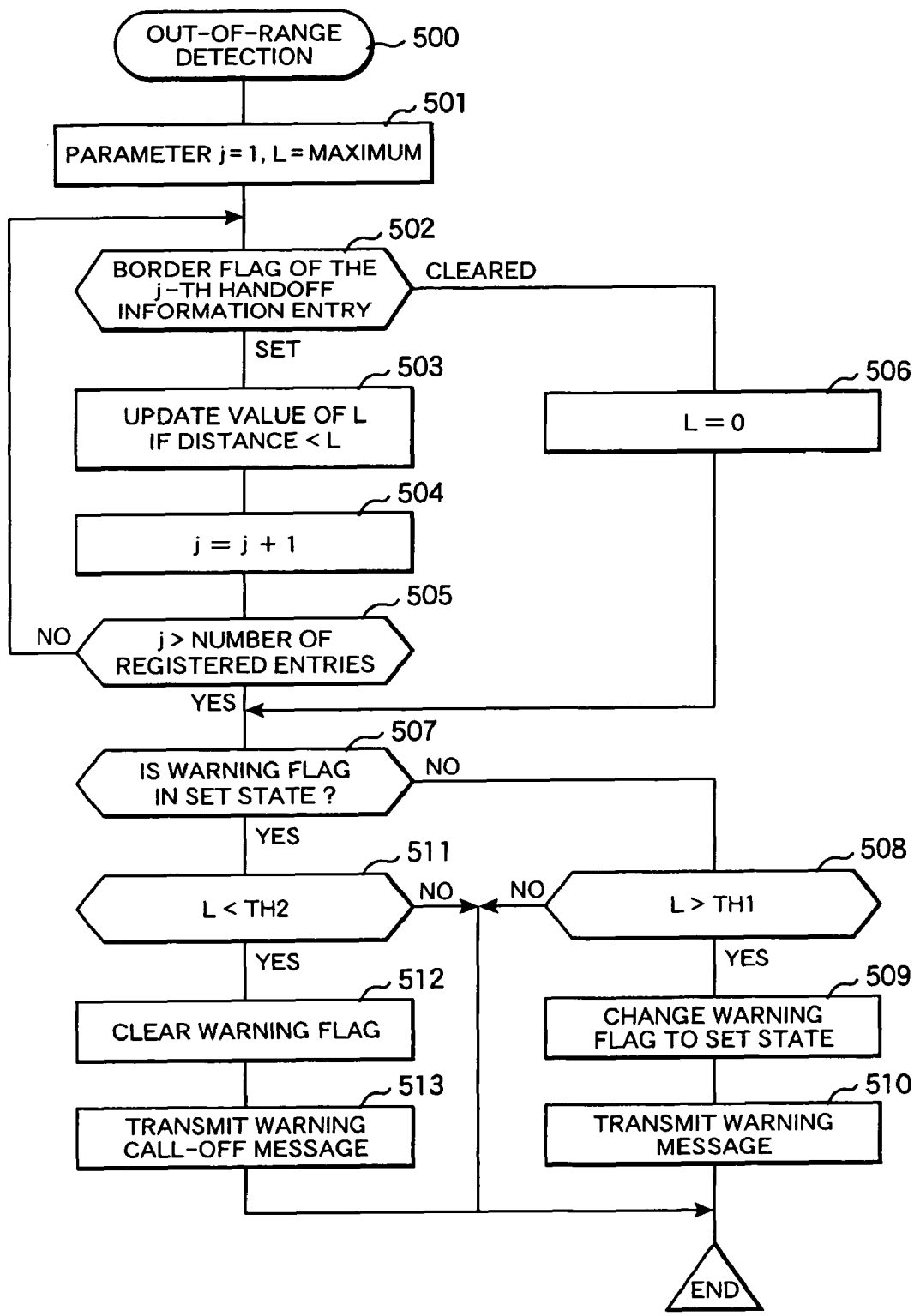
FIG. 12 is a flow chart showing an example of out-of-range detection processing to be performed by the base station controller 40.

FIG. 12 is a flow chart showing in detail the out-of-range detection processing 500.

In the out-of-range detection processing 500, the processor sets an index j for specifying one of the handoff information entries in the handoff list 474 linked to a MS information entry EN-k having the mobile station ID indicated by the received handoff information to an initial value of 1 and sets a parameter L for indicating the minimum value of the distance to the mobile station to an initial value which is a maximum usable value (501). Then, the processor checks the border flag 322 of the j-th handoff information entry (502). If the border flag is in a cleared state, i.e., when at least one of the handoff information entries for the base stations each forming a normal cell has been registered in the handoff list 474, the processor sets the parameter L to 0 (506) and advances to Step 507.

When the border flag is in a set state, the processor compares the distance 325 indicated by the j-th handoff information entry with the value of the parameter L. If the distance 325 is smaller than L, the processor sets the value of the distance 325 to the parameter L (503). After that, the processor increments the value of the index j (504) and compares the index j with the number N of the entries registered in the handoff list 474 (505). If the index j is not exceeding N, Steps 502 to 505 are repeated. When j>N is found, the control sequence advances to Step 507.

In Step 507, the processor checks the warning flag 472 indicated by the MS information entry EN-k. If the warning flag 472 is in the cleared state, the processor compares the value of the distance parameter L with the out-of-range threshold 473A indicated by the MS information entry EN-k (508). If the value of the parameter L is larger than the out-of-range threshold 473A, the processor sets the warning flag 472 to "1" (509), transmits a warning message to the mobile station (510), and terminates the out-of-range detection processing.

When the warning flag 472 is in the set state in Step 507, the processor compares the value of the parameter L with the within-range threshold 473B (511). If the value of the parameter L is not less than the within-range threshold 473B, the processor terminates the out-of-range detection processing. If the value of the parameter L is smaller than the within-range threshold 473B, the processor clears the warning flag 472 (512), transmits a warning call-off message to the mobile station (513), and terminates the out-of-range detection processing.

As the values of out-of-range threshold 473A and the within-range threshold 473B, values common to all of the mobile stations are set, but individual values different for each mobile station may be set depending on the specific information on each of the mobile stations available from the AAA server 50.

Figure 13:
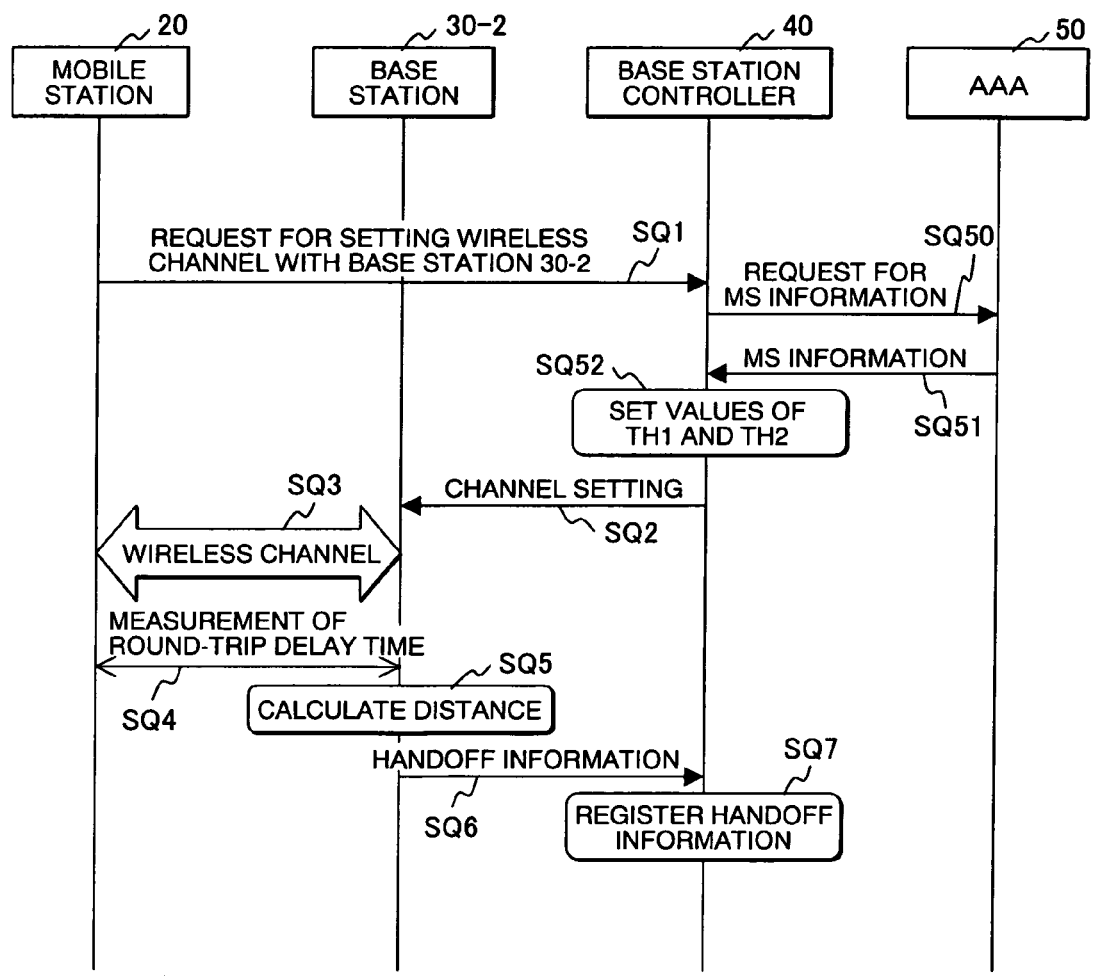
FIG. 13 is a view showing the communication sequence to be performed in the case where the base station controller 40 acquires out-of-range/within-range threshold values from an AAA server 50.

FIG. 13 shows a communication sequence to be performed in the case where the base station controller 40 sets the values of out-of-range threshold 473A and within-range threshold 473B based on specific information on each of the mobile stations obtained from the AAA server 50.

Upon receiving the control signal indicating the request for setting the wireless channel from the mobile station 20 (SQ1), the base station controller 40 requests the mobile station information (specific information) from the AAA server 50, specifying the mobile station ID (SQ50). The request for the mobile station information is issued by the handoff information registration processing unit 420 shown in FIG. 10 before Step 422. The AAA server 50 transmits the mobile station information to the base station controller 40 in response to the request (SQ51). The mobile station information includes specific values of out-of-range and within-range thresholds determined depending on the device performance of the mobile station 20.

Upon receiving the mobile station information from the AAA server 50, the base station controller 40 extracts these specific thresholds and sets them as the out-of-range threshold 473A and the within-range threshold 473B to the MS information entry EN-k of the mobile station 20 (SQ52) in Step 423 of FIG. 10. Thereafter, the same sequence as shown in FIG. 8 is executed.

The distance calculation unit 310 of the base station 30 can calculate, with an arbitrary timing, the distance to the mobile station connected via the wireless channel and notify the base station controller 40 of the calculated distance as the handoff information. In the case where each of the base stations periodically transmits the handoff information for each mobile station to the base station controller 40, the base station controller 40 can cope with the out-of-range detection of the mobile station moving at a high speed by reducing the transmission period thereof. Conversely, by increasing the transmission period, a load placed on the base station controller 40 by the handoff information update processing can be reduced. Therefore, it is also possible to change the period of transmission of the mobile station handoff information to the base station controller 40 depending on whether the mobile station is located in the normal cell or in the border cell.

A description will be given next to the second embodiment of the mobile communication system according to the present invention with reference to FIGS. 14 to 16.

In the second embodiment, even when the radii of the cells are different by base station, setting the thresholds in accordance with the size of the cell is allowed by providing each of the base stations with specific out-of-range/within-range thresholds. The second embodiment is different from the first embodiment in the base station system parameters 320, in the management method for the handoff information, and in the out-of-range detection processing performed by the base station controller 40.

Figure 14:
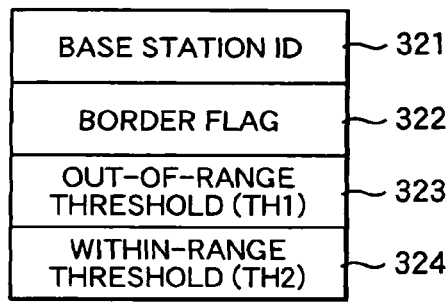
FIG. 14 is a view showing another embodiment of the system parameters stored in the system parameter memory 320 by the base station 30.

In the mobile communication system according to the second embodiment, each of the base stations includes not only the base station ID 321 and the border flag 322 but also an out-of-range threshold 323 and a within-range threshold 324 as the base station system parameters 320, as shown in FIG. 14. As the out-of-range threshold 323 and the within-range threshold 324, different values can be set for the individual base stations.

Figure 15:
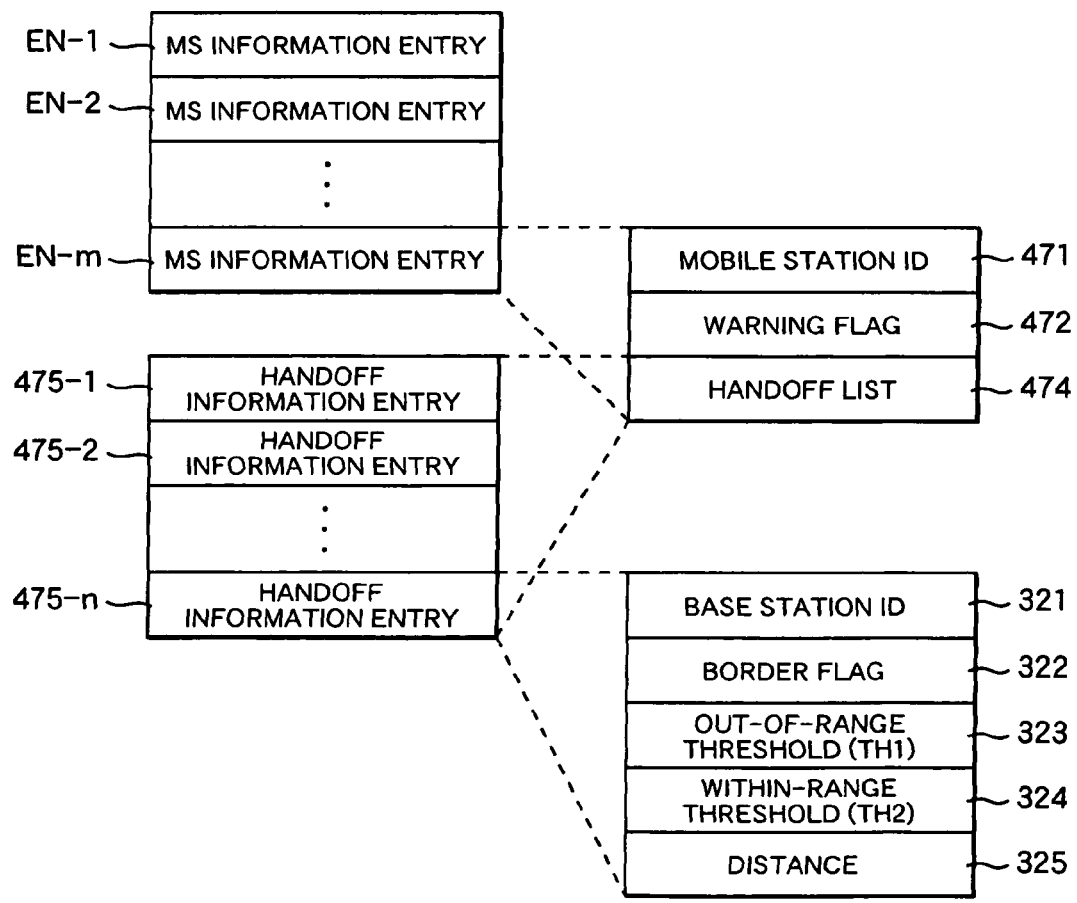
FIG. 15 is a view showing another embodiment of mobile station information stored in the handoff information management table 470 by the base station controller 40.

FIG. 15 shows the structure of the handoff information stored by the base station controller 40 in the handoff information management table 470 according to the second embodiment.

Compared with the handoff information according to the first embodiment shown in FIG. 6, the out-of-range threshold 473A and the within-range threshold 473B which have been set individually for each of the mobile stations are omitted from each of the MS information entries EN-i (i=1 to m). Instead, the out-of-range threshold 323 and the within-range threshold 324 notified from each of the base stations are stored in each of the handoff information entries 475-j (j=1 to n) of the individual base stations registered in the handoff list 474.

Figure 16:
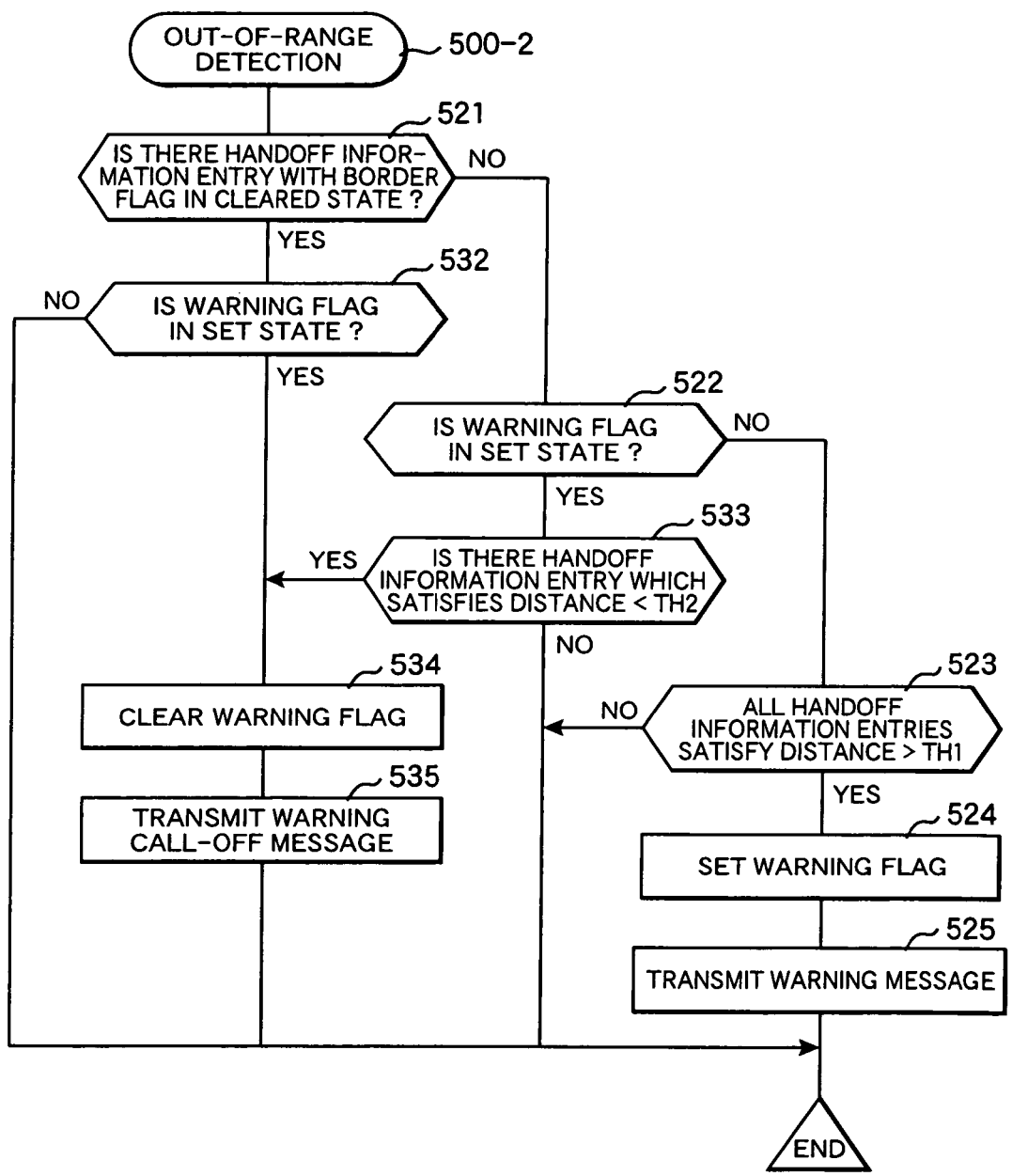
FIG. 16 is a flow chart showing another embodiment of the out-of-range detection processing to be performed by the base station controller 40.

FIG. 16 shows a flow chart of out-of-range detection processing 500-2 according to the second embodiment which is executed by the handoff information registration processing unit 420 and handoff information update processing unit 440 of the base station controller 40 in place of the out-of-range detection processing 500.

In the out-of-range detection processing 500-2, the processor of the base station controller 40 first retrieves the handoff information management table 470 for the MS information entry EN-k corresponding to the mobile station ID indicated by the received handoff information, checks the handoff list 474 of the entry EN-k, and determines the presence or absence of the handoff information entry with the cleared border flag 322 (Step 521). In this determination, as shown in Steps 501, 502, 504, and 505 of FIG. 12, the processor checks, by progressively incrementing the value of an index j for specifying the handoff information entry from the initial value thereof, the border flag 322 of the j-th entry. The processor judges that an objective entry is "Present" when a handoff information entry with a cleared border flag 322 is found, and concludes as "Absent" if the final handoff information entry is also confirmed to have the border flag 322 in the set state.

When there is no handoff information entry with the cleared border flag 322 in the handoff list 474 of the entry EN-k, i.e., when the mobile station is located at a position where it is communicative only with one or more of the border cell base stations, the processor checks the warning flag 472 of the MS information entry EN-k (522) and performs Step 533 which will be described later, if the warning flag 472 is in the set state.

If the warning flag 472 is in the cleared state, the processor compares the value of the distance 325 registered in each of the handoff information entries 475 of the handoff list 474 with the out-of-range threshold 323 (523). When the distance 325 has exceeded the out-of-range threshold 323 in each of the handoff information entries 475, the processor brings the warning flag 472 into the set state (524), transmits a warning message to the mobile station (525), and terminates the routine. When at least one handoff information entry in which the distance 325 is not more than the out-of-range threshold 323 is found in the handoff list 474, the processor immediately terminates the routine.

In Step 522, if the warning flag 472 is in the set state, the processor compares the value of the distance 325 registered in each of the handoff information entries 475 of the handoff list 474 with the within-range threshold 324 (533). When at least one handoff information entry 475 in which the distance 325 is smaller than the within-range threshold 324 is found, the processor brings the warning flag 472 into the cleared state (534), transmits a warning call-off message to the mobile station (535), and terminates the routine. If the distance 325 is not less than the within-range threshold 324 in all of the handoff information entries 475 of the handoff list 474, the processor terminates the routine without changing the state of the warning flag.

In Step 521, when at least one handoff information entry with the cleared border flag 322 is found in the handoff list 474 of the entry EN-k, the processor checks the warning flag 472 (532) and executes Steps 534 and 535 if the warning flag is in the set state. Otherwise, the processor terminates the routine without changing the state of the warning flag.

Figure 17:
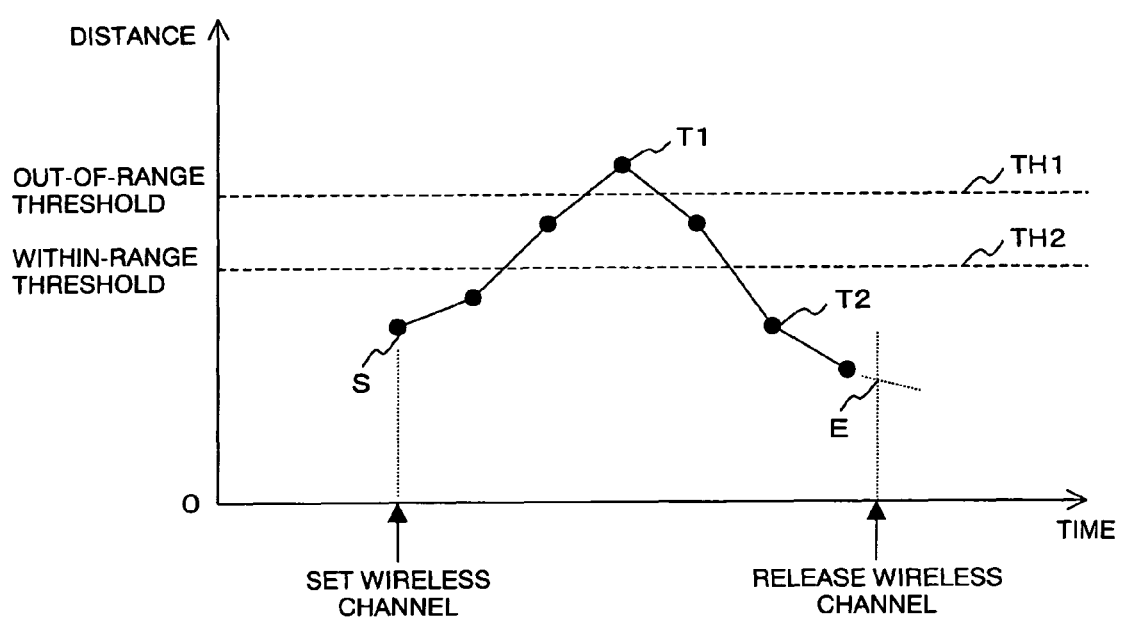
FIG. 17 is a view for illustrating variations in the distance to the mobile station measured by the base station 30 and a timing for transmitting handoff information to the base station controller 40.

FIG. 17 shows an example of a change in the distance to a given mobile station measured by the base station 30 via a specified wireless channel. In the drawing, the abscissa axis represents the time, the ordinate axis represents the distance, and TH1 and TH2 represent the out-of-range threshold 323 and the within-range threshold 324 set as the base station system parameters 320, respectively.

As shown by the solid circles, the base station 30 starts periodical calculation of the distance to the mobile station via the wireless channel in response to the setting S of the wireless channel for the mobile station. The calculation of the distance to the mobile station is repeated until the wireless channel is released, as shown by E. Upon receiving the channel setting instruction SQ2 (or SQ12) from the base station controller 40, as described above with reference to FIG. 5, the base station 30 notifies the base station controller 40 of the distance to the mobile station as the handoff information SQ6 (or SQ16) responding to the instruction.

As described above with reference to FIG. 9, the base station 30 may also periodically notify the base station controller 40 of the distance information of the mobile station. Alternatively, to reduce the traffic of control information between the base station 30 and the base station controller 40, the base station 30 may also compare the position of each of the mobile stations with each of the out-of-range threshold 323 (TH1) and the within-range threshold 324 (TH2) and selectively notify the base station controller 40 of the handoff information with the timing T1, when the distance to the mobile station has exceeded the out-of-range threshold TH1, or with the timing TH2, when the distance to the mobile station has become equal or less than the within-range threshold TH2 thereafter.

With each of the base stations 30 periodically performing the distance calculation and selectively notifying the base station controller of the handoff information in accordance with the result of comparison with the out-of-range/within-range thresholds until the wireless channel for the mobile station 20 is released, it becomes possible to greatly reduce the load placed on the base station controller 40 by the handoff information update processing and the traffic of the control information, while supporting the out-of-range detection of the mobile station moving at a high speed.

Since the present invention pays attention on a mobile station communicating only with the border cell base station in the mobile communication system and detects the mobile station moving out of communication range by judging whether the distance between the base station and the mobile station calculated from the signal round-trip delay time has exceeded a specified threshold, it becomes possible to particularly detect a mobile station that is moving within a border cell toward the vicinity of the boundary of the service area with high accuracy and to transmit a warning message to the mobile station. In each of the embodiments, the base station controller 40 gives the warning message to the mobile station in the border cell when the distance between the mobile station and the base station has exceeded the specified threshold and repeats the determination of whether the mobile station has returned to the within-range area thereafter. However, it is also possible to repeat the transmission of the warning message to the mobile station on which the out-of-range was detected.

What is claimed is:

1. A mobile communication system comprising a plurality of base stations, each of which performs wireless communication with mobile stations located within a cell formed thereby, and a base station controller connected to the plurality of base stations, wherein each of said base stations includes:

a system parameter storage for storing a base station identifier and a border flag indicative of whether the base station is a border cell base station forming a border cell located on a boundary portion of a service area or a normal cell base station forming a normal cell located on the inward side than the border cell; and a distance calculation unit for calculating a distance to each of the mobile stations connected via wireless channels and notifying said base station controller of distance information of each of the mobile stations in conjunction with the base station identifier and the border flag as handoff information, and said base station controller includes:

a handoff information management table for storing the base station identifier, the border flag, and the mobile station distance information notified from each of the base stations in association with each of mobile station identifiers; and an out-of-range detection unit for updating said handoff information management table each time new handoff information is received from each of said base stations and detecting any of the mobile stations moving out of the service area into an out-of-communication region, wherein said out-of-range detection unit performs out-of-range detection by selectively monitoring any of the mobile stations that is currently communicative only with one or more of said border cell base stations discriminated by a state of the border flag as a detection target and comparing the distance information of the mobile station indicated by said handoff information management table with a specified threshold value;

wherein said out-of-range detection unit performs the out-of-range detection of each of the mobile stations by using a threshold value common to the plurality of base stations; and wherein said out-of-range detection unit performs the out-of-range detection of each of the mobile stations by selecting the distance information with a minimum value from among the distance information on the same mobile station measured at the plurality of border cell base stations and compares the selected minimum distance information with said threshold value.

2. A mobile communication system according to claim 1, wherein said handoff information management table stores an individual threshold value for each of the base stations, and said out-of-range detection unit performs the out-of-range detection by comparing the mobile station distance information with the individual threshold value for each of the base stations.

3. A mobile communication system according to claim 1, wherein said out-of-range detection unit transmits an out-of-range warning message to any of the mobile stations detected to be at a distance exceeding said threshold value.

4. A mobile communication system according to claim 3, wherein said handoff information management table stores, in association with each of the mobile station identifiers, a warning flag indicative of whether the out-of-range warning message has been transmitted, and said out-of-range detection unit clears the warning flag when it detects based on said handoff information management table that any of the mobile stations, for which the warning flag indicates that the out-of-range warning message has been transmitted, has become communicative with one of said normal cell base stations or that the distance between the mobile station and one of said border cell base stations has fallen within a range of a second threshold smaller than said threshold.

* * * * *